(12) United States Patent
Yadid-Pecht et al.

(10) Patent No.: US 6,515,702 B1
(45) Date of Patent: Feb. 4, 2003

(54) ACTIVE PIXEL IMAGE SENSOR WITH A WINNER-TAKE-ALL MODE OF OPERATION

(75) Inventors: Orly Yadid-Pecht, Haifa (IL); Eric R. Fossum, La Crescenta, CA (US); Carver Mead, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/114,689

(22) Filed: Jul. 13, 1998

Related U.S. Application Data

(60) Provisional application No. 60/052,401, filed on Jul. 14, 1997.

(51) Int. Cl.⁷ .......................... H04N 5/335; H04N 9/64
(52) U.S. Cl. ...................... 348/308; 348/246; 348/302
(58) Field of Search ................................ 348/302, 308, 348/246, 247

(56) References Cited

U.S. PATENT DOCUMENTS

| | | | | |
|---|---|---|---|---|
| 5,327,246 A | * | 7/1994 | Suzuki .......................... 348/246 |
| 5,444,484 A | * | 8/1995 | Yutani et al. ................. 348/302 |
| 5,471,515 A | | 11/1995 | Fossum et al. |
| 5,541,402 A | | 7/1996 | Ackland et al. |
| 5,576,763 A | | 11/1996 | Ackland et al. |
| 5,726,439 A | * | 3/1998 | Miyawaki et al. ........... 348/302 |
| 5,812,191 A | * | 9/1998 | Orava et al. ................. 348/302 |
| 5,909,026 A | | 6/1999 | Zhou et al. |
| 6,166,768 A | * | 12/2000 | Fossum et al. .............. 348/302 |
| 6,288,744 B1 | * | 9/2001 | Takahashi et al. ........... 348/311 |
| 2002/0001037 A1 | * | 1/2002 | Miyawaki et al. ........... 348/302 |

OTHER PUBLICATIONS

"CMOS Active Pixel Image Sensors for Highly integrated imaging Systems", Fossum et al., IEEE Journal of solid-state Circuits, vol. 32, No. 2, Feb. 1997.*

"Application of the active pixel sensor concept to guidance and navigation", Fossum et al., Proceedings of the SPIE vol. 1949 Space Guidance, control and Tracking, paper 30, 1993.

"CMOS Active Pixel Image Sensor", Mendis et al., IEEE Transactions On Electron Devices, vol. 41, No. 3, Mar. 1994, pp. 452–453.

"Progress In CMOS Active Pixel Image Sensors", Mendis et al., Proceedings of the SPIE vol. 2172, Charge–Coupled Devices and Solid State Optical Sensor IV (1994).

* cited by examiner

Primary Examiner—Wendy R. Garber
Assistant Examiner—Lin Ye
(74) Attorney, Agent, or Firm—Fish & Richardson P.C.

(57) ABSTRACT

An integrated CMOS semiconductor imaging device having two modes of operation that can be performed simultaneously to produce an output image and provide information of a brightest or darkest pixel in the image.

9 Claims, 6 Drawing Sheets

ACTIVE PIXEL IMAGE SENSOR WITH A WINNER-TAKE-ALL MODE OF OPERATION

This application claims the benefit of the U.S. Provisional Application No. 60/052,401, filed on Jul. 14, 1997, which is incorporated herein by reference.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to radiation sensing, and more particularly to semiconductor imaging devices based on CMOS pixel sensors.

BACKGROUND

Various semiconductor detector arrays have been used to detect radiation energy in imaging applications. Charge coupled devices ("CCDs") are one type of widely-used semiconductor detector arrays based on transfer of radiation-induced charge through a series of charge coupling stages. A very high charge transfer efficiency must be maintained in a CCD in order to maintain good signal fidelity. This necessitates a special formation process in manufacturing CCDs. This special formation process prevents CCDs from being easily integrated with on-chip integrated circuits such as complementary-metal-oxide-semiconductor ("CMOS") integrated circuits.

Another type of semiconductor detector arrays is active pixel sensor ("APS") devices. Each active pixel includes a light sensing element and one or more active transistors within the pixel itself to generate and/or process electrical signals indicative of the amount of charge induced by radiation received by the light sensing element. A single stage of charge couple is needed in APS devices. This eliminates the charge transfer over distances through multiple stages inherent in CCDs. Each APS pixel can be formed by using CMOS process. U.S. Pat. No. 5,471,515 to Fossum et al. and U.S. Pat. No. 5,576,763 to Ackland et al. disclose examples of CMOS APS devices, which are incorporated herein by reference.

A CMOS APS imaging device can be configured to include a CMOS circuit in each active pixel for various on-chip operations and controls, e.g., random access and on-chip signal processing.

SUMMARY

The present disclosure provides a CMOS APS device capable of two independent modes of operation: a regular imager mode and a winner-take-all mode. In the regular imager mode, all signals from the active pixels are read out to form an image indicative of an input radiation scene. In the winner-take-all mode, the sensor provides information of the pixel that is "brightest" among all pixels in a frame, i.e., the pixel that produces the highest amount of charge. This can be accomplished additional circuitry located in the periphery of a radiation-sensing array to maintain a desired fill factor.

One embodiment of the present invention includes a CMOS sensor array and a pixel-selecting circuit comprises a signal-receiving circuit connected to receive electrical signals from the sensor array, a signal-processing circuit comparing said electrical signals from different CMOS detectors to select a special CMOS detector, and a memory unit storing a signal value and address of the special pixel. The pixel-selecting circuit is located in the periphery of the sensor array to maintain a high fill factor in the sensor array.

These and other aspects and advantages of the present invention will become more apparent in light of the following detailed description, the accompanying drawings, and the claims.

DETAILED DESCRIPTION OF THE PREFERRED EMBODIMENTS

Figure 1:
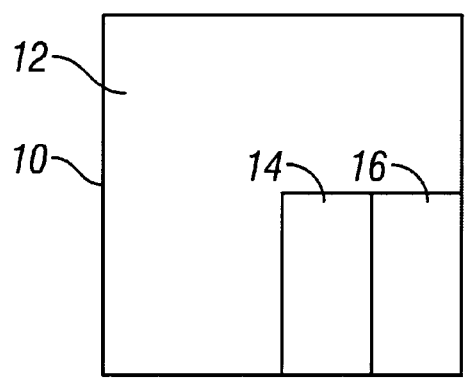
FIG. 1 is a diagram illustrating an exemplary architecture of an individual active pixel of an APS device.

FIG. 1 is a simplified block diagram of one active pixel cell of a focal plane array of many such cells formed in an integrated circuit of a CMOS APS device. Each cell 10 includes a photogate 12, a charge transfer section 14 adjacent the photogate 12 and a readout circuit 16 adjacent the charge transfer section 14.

Figure 2:
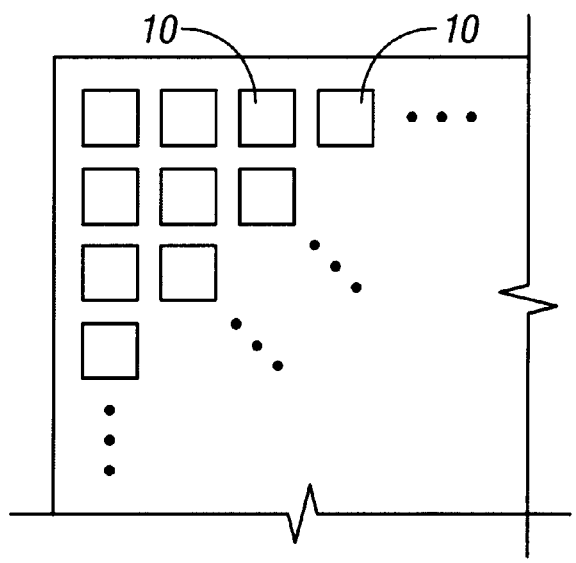
FIG. 2 is a plan view of an integrated circuit having a focal plane array of cells of the type illustrated in FIG. 1.

FIG. 2 shows a focal plane array of many cells 10 formed on a silicon substrate.

Figure 3:
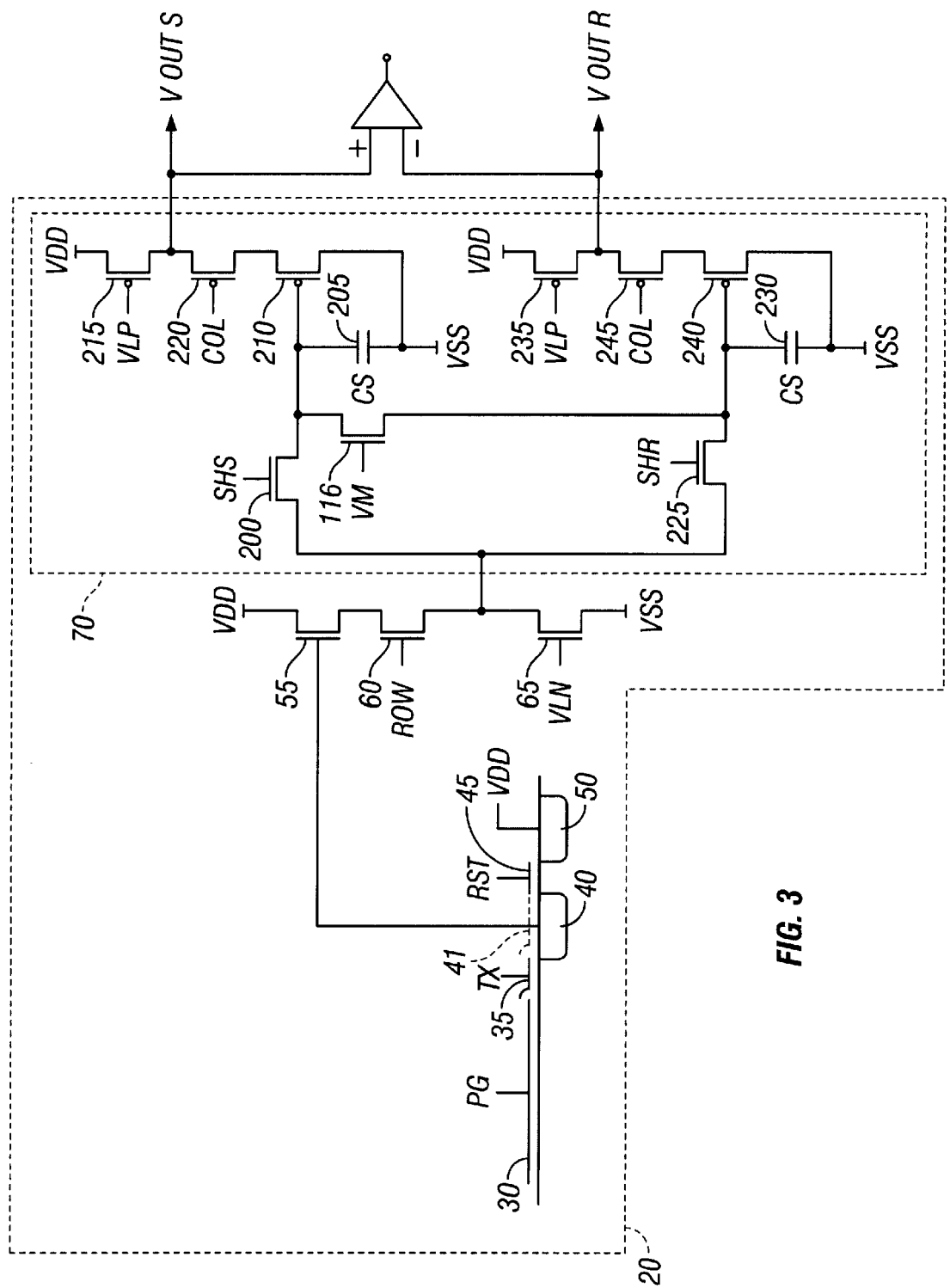
FIG. 3 is a schematic diagram of one implementation of the active pixel of FIG. 1.

FIG. 3 is a simplified schematic diagram of a cell 10 and its associated processing circuitry. Each pixel 300 includes a photogate area and its associated circuitry (30–50) and row decoder elements 55,60. The photogate 12 having a relatively large photogate electrode 30 overlying a substrate. The charge transfer section 14 has a transfer gate electrode 35 adjacent the photogate electrode 30, a floating diffusion 40, a reset electrode 45 and a drain diffusion 50. The readout circuit 16 has a source follower field effect transistor (FET) 55, a row select FET 60, a load FET 65 and a correlated double sampling circuit 70.

Figure 4:
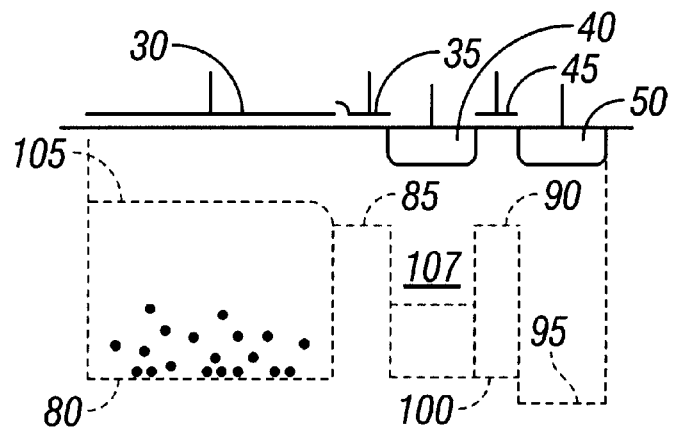
FIG. 4 is a graph of the surface potential in the charge transfer section of the cell of FIG. 3.

The surface potential diagram of FIG. 4 shows the photogate electrode 30 being held by a photogate signal PG at a positive voltage to form a potential well 80 in the substrate 20 in which photo-generated charge is accumulated during an integration period. The transfer gate electrode 35 is initially held at a less positive voltage by a transfer gate signal TX to form a potential barrier 85 adjacent the potential well 80. The floating diffusion 40 is connected to the gate of the source follower FET 55 whose drain is connected to a drain supply voltage VDD. The reset electrode 45 is initially held by a reset signal RST at a voltage corresponding to the voltage on the transfer gate 30 to form a potential barrier 90 thereunder. The drain supply voltage VDD connected to the drain diffusion 50 creates a constant potential well 95 underneath the drain diffusion 50.

During the integration period, electrons accumulate in the potential well 80 in proportion to photon flux incident on the substrate 20 beneath the photogate electrode 30. At the end of the integration period, the surface potential beneath the floating diffusion 40 is quickly reset to a potential level 100 slightly above the potential well 95. This is accomplished by the reset signal RST temporarily increasing to a higher positive voltage to temporarily remove the potential barrier 90 and provide a downward potential staircase from the transfer gate potential barrier 85 to the drain diffusion potential well 95, as indicated in the drawing of FIG. 4. After the reset gate 45 is returned to its initial potential (restoring the potential barrier 90), the readout circuit 70 briefly samples the potential of the floating diffusion 40, and then the cell 10 is ready to transfer the photo-generated charge from beneath the photogate electrode 30. For this purpose, the photogate signal PG decreases to a less positive voltage to form a potential barrier 105 beneath the photogate electrode 30 and thereby provide a downward staircase surface potential from the photogate electrode 30 to the potential well 100 beneath the floating diffusion 40. This operation transfers the charge from beneath the photogate electrode 30 to the floating diffusion 40, changing the potential of the floating diffusion 40 from the level (100) at which it was previously reset to a new level 107 indicative of the amount of charge accumulated during the integration period. This new potential of the floating diffusion 40 is sensed at the source of the source follower FET 55. However, before the readout circuit 70 samples the source of the source follower FET 55, the photogate signal PG returns to its initial (more positive) voltage. The entire process is repeated for the next integration period.

The readout circuit 70 has a signal sample and hold (S/H) circuit including an S/H FET 200 and a signal store capacitor 205 connected through the S/H FET 200 and through the row select FET 60 to the source of the source follower FET 55. The other side of the capacitor 205 is connected to a source bias voltage VSS. The one side of the capacitor 205 is also connected to the gate of an output FET 210. The drain of the output FET is a connected through a column select FET 220 to a signal sample output node VOUTS and through a load FET 215 to the drain voltage VDD. A signal called "signal sample and hold" (SHS) briefly turns on the S/H FET 200 after the charge accumulated beneath the photogate electrode 30 has been transferred to the floating diffusion 40, so that the capacitor 205 stores the source voltage of the source follower FET 55 indicating the amount of charge previously accumulated beneath the photogate electrode 30.

The readout circuit 70 also has a reset sample and hold (S/H) circuit including an S/H FET 225 and a signal store capacitor 230 connected through the S/H FET 225 and through the row select FET 60 to the source of the source follower FET 55. The other side of the capacitor 230 is connected to the source bias voltage VSS. The one side of the capacitor 230 is also connected to the gate of an output FET 240. The drain of the output FET 240 is connected through a column select FET 245 to a reset sample output node VOUTR and through a load FET 235 to the drain voltage VDD. A signal called "reset sample and hold" (SHR) briefly turns on the S/H FET 225 immediately after the reset signal RST has caused the resetting of the potential of the floating diffusion 40, so that the capacitor 230 stores the voltage to which the floating diffusion has been reset.

The readout circuit provides a special form of correlated double sampling of the potential of the floating diffusion, allowing the charge integrated beneath the photogate 12 during each integration period to be obtained at the end of each integration period from the difference between the voltages at the output nodes VOUTS and VOUTR of the readout circuit 70. This minimizes the effects of kTC noise because the difference between VOUTS and VOUTR is independent of any variation in the reset voltage on the floating diffusion 40. It also suppresses fixed pattern noise produced by threshold variations in transistor 55. It also suppresses 1/f noise produced by transistors 55,60 and 65.

Figure 5:
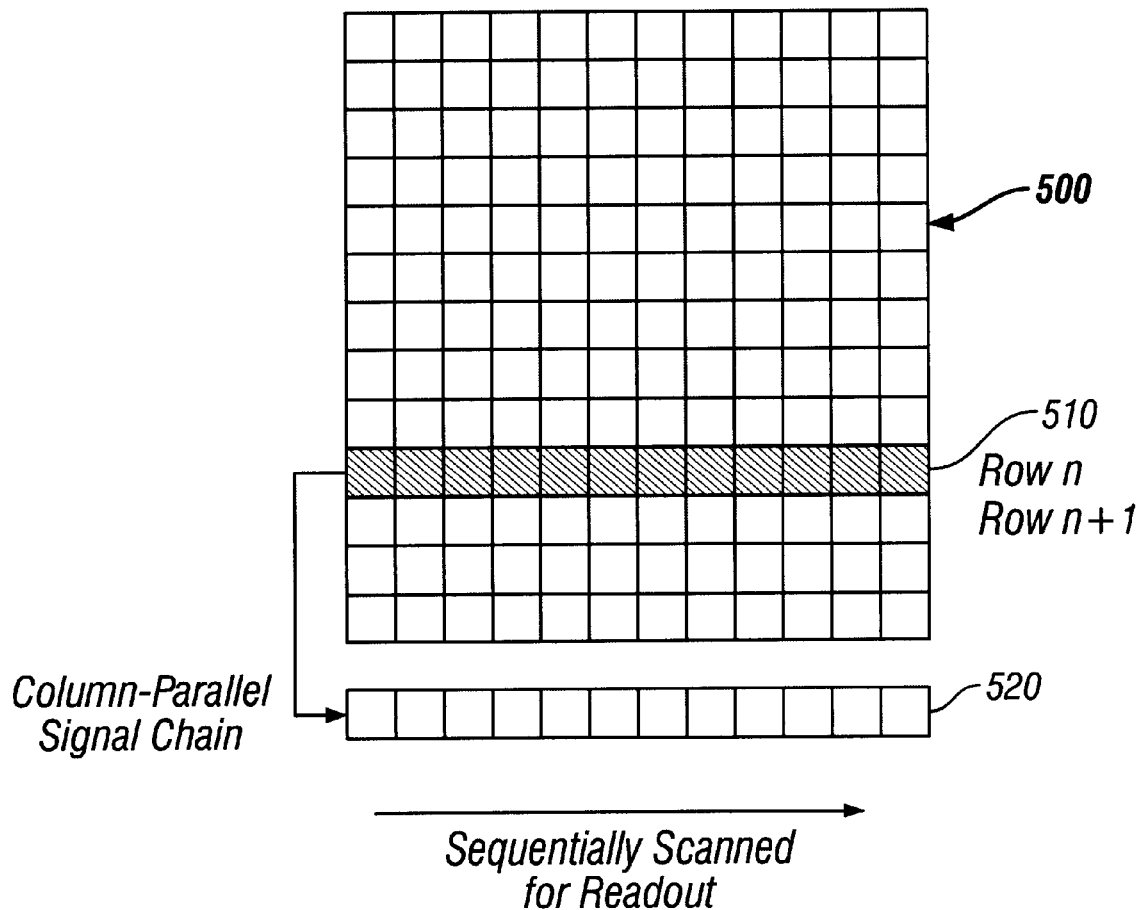
FIG. 5 is a diagram illustrating one implementation of a regular image readout mode of an APS device.

FIG. 5 illustrates one implementation of image readout of an APS device 500 having an array 510 of N rows and M columns of active pixels. A column-parallel signal chain 520 such as a sampling capacitor bank with M storage cells is formed relative to the array 500 for readout.

In a regular image readout mode, one row is selected for readout at one time. The signals from the M pixels in the selected row are respectively copied onto the corresponding storage cells of the column-parallel signal chain 520. This copy process also resets the pixels in the selected row and begins a new integration. The M storage cells in the column-parallel signal chain 520 are then scanned sequentially for readout. The above readout process is then repeated for the remaining rows until the entire frame is read out.

The above regular image readout may be implemented by other readout methods and sensor configurations. For example, one or more additional column-parallel signal chains similar to 520 may be added to achieve two or more different integration times of each cell for improved dynamic range or to improve other performance parameters of the APS device.

Certain imaging applications also need information of the brightest pixel in a captured frame, such as the corresponding signal strength and the pixel location in the array. Additional circuitry is needed to perform this "Winner-Take-All" mode of operation. Preferably, this operation does not interfere with the regular imager mode of operation and "finds" the brightest pixel without reading out an entire frame of pixels.

Figure 6:
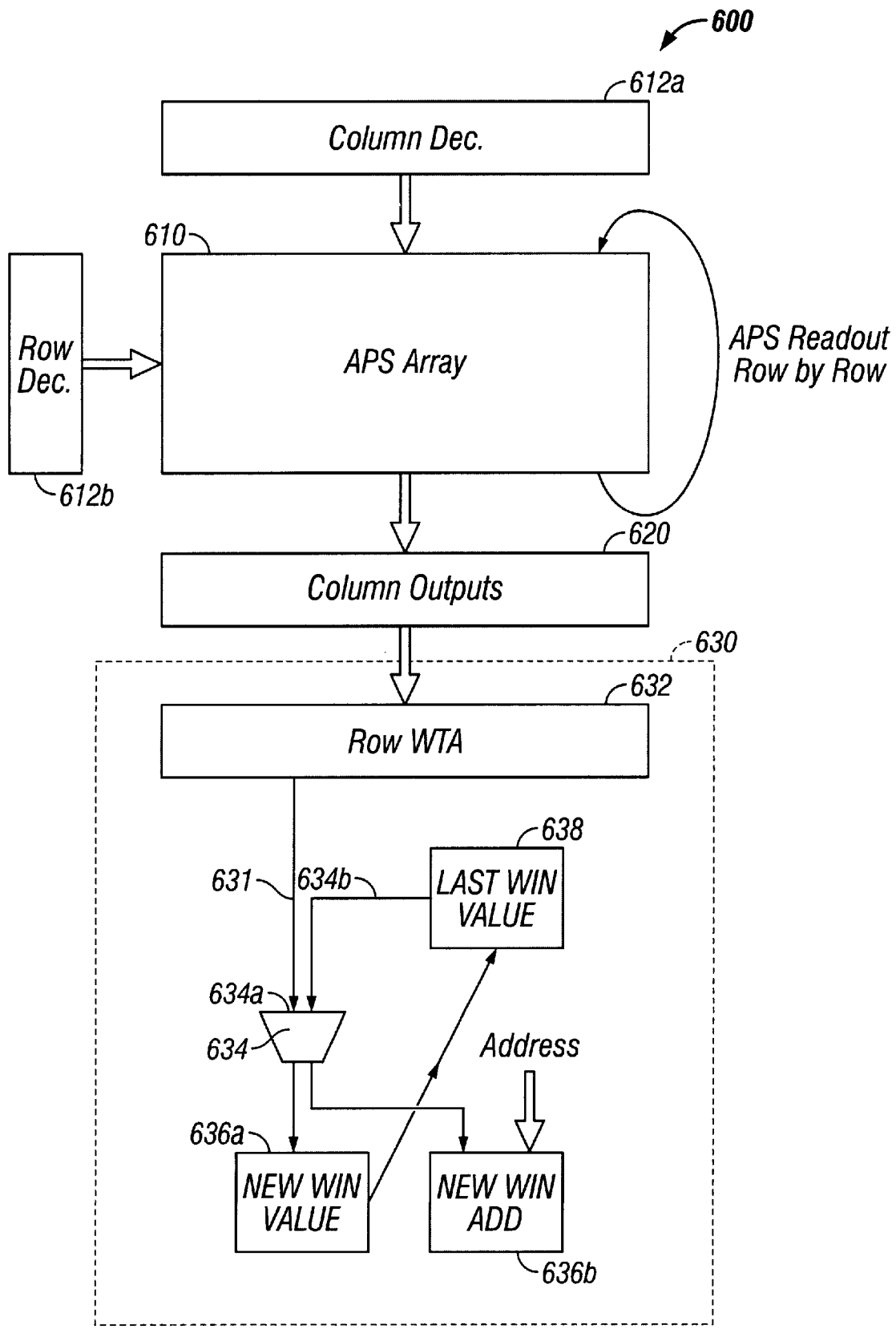
FIG. 6 is a block diagram showing one embodiment of an APS device with a winner-take-all circuit.

FIG. 6 is a block diagram showing one embodiment 600 of an APS device with a winner-take-all circuit. The APS device 600 includes a sensor array 610 having rows and columns of active pixels, a column decoder 612a for selecting columns, a row decoder 612b for selecting rows, a column-parallel signal output chain 620 for image readout, and a winner-take-all circuit 630 for searching and selecting the brightest pixel in a frame of interest. The winner-take-all circuit 630 is preferably located outside the sensor array 610 so that no additional circuitry is added to each pixel. This achieves a high fill factor in the sensor array 610 and a high imaging resolution.

The sensor array 610 is read out by the column-parallel signal chain 620 row by row in the regular imager mode as illustrated in FIG. 5. The winner-take-all circuit 630 finds the brightest pixel for a selected row that is being read out. The winner value 631 is coupled to comparator 634, which compares the winner 631 to the previous winner stored in buffer 638. A new winner, if any is stored at 676a so that the circuit 630 continues to update the information on the brightest pixel for all the rows that have been read out. Hence, when a frame is read out, a winner pixel for the entire frame is found and stored in the circuit 630 for further processing.

The regular image readout can continue without any interference. The memory units 636a, 636b store the pixel value and address of the latest winner pixel, respectively. The signal comparator 634 has two input terminals 634a and 634b. The first input terminal 634a is connected to the column-parallel signal chain 632 to read out the pixel values of a copied row one at a time in a sequence (e.g., from one end to another of the cells in 630). The second terminal 634b is connected to the memory unit 638 which stores the signal value of the previously-picked winner pixel. The initial value for the memory unit 638 for a new captured frame can be the signal of the first pixel that is read out by the input terminal 634b or any pixel in that frame.

Any kind of winner-take-all circuit can be used as device 630. One device is described in U.S. Pat. No. 5,146,106. A preferred device is described in Lazzaso, et al., "Winner-Take-All Networks of O(N) complexity", Advances in Neural Information Processing System, I: 705–711, San Mateo, Calif. 1989. While this system has limited accuracy, it is fast and compact.

Figure 7:
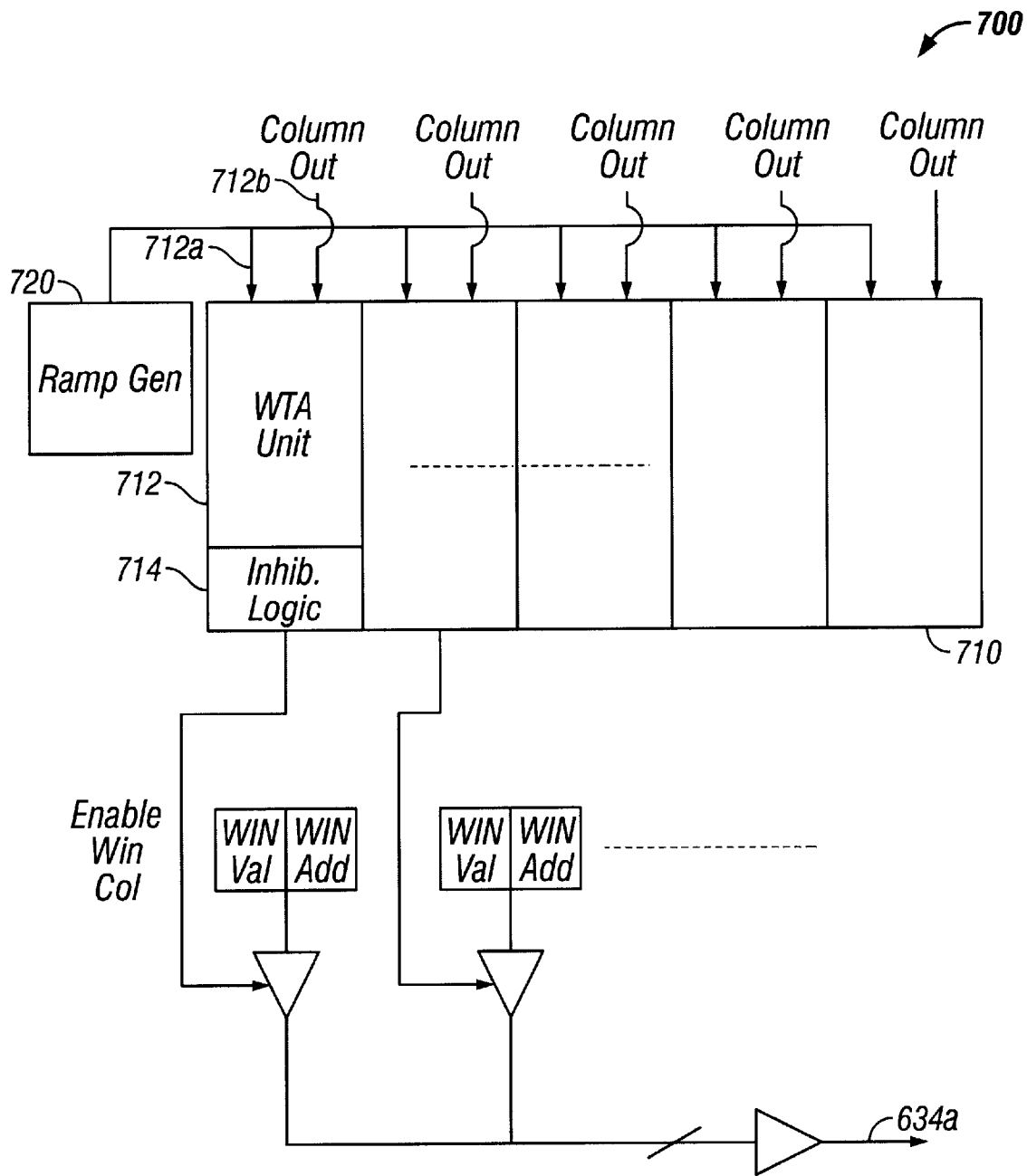
FIG. 7 is a diagram showing an alternative winner-take-all circuit for the device shown in FIG. 6.

Another option is shown in FIG. 7. A column-parallel circuit chain 710 is implemented to have multiple column-parallel units each having a comparator unit 712 and an inhibition logic 714. The comparator unit 712 receives a common ramp signal at a first input terminal 712a from a ramp generator 720 and a pixel signal from a corresponding pixel in a selected row from the column-parallel signal chain 620 in FIG. 6. The ramp signal and each column value are compared. The ramp signal is a up-going ramp that covers the signal output range of the active pixels. The inhibition logic units 714 are configured in such a way that the column having the highest column value within the ramp signal range is selected as the winner for that selected row. This generates an Enable Win Col signal while other columns are inhibited. Each of the inhibition logic unit 714 may be formed by a large OR gate. The pixel value and address of the selected pixel are then output to the comparator 634 to compare with the winner from another row as described previously. Hence, all the pixels in a selected row are processed simultaneously to select the winner of the row.

Figure 8:
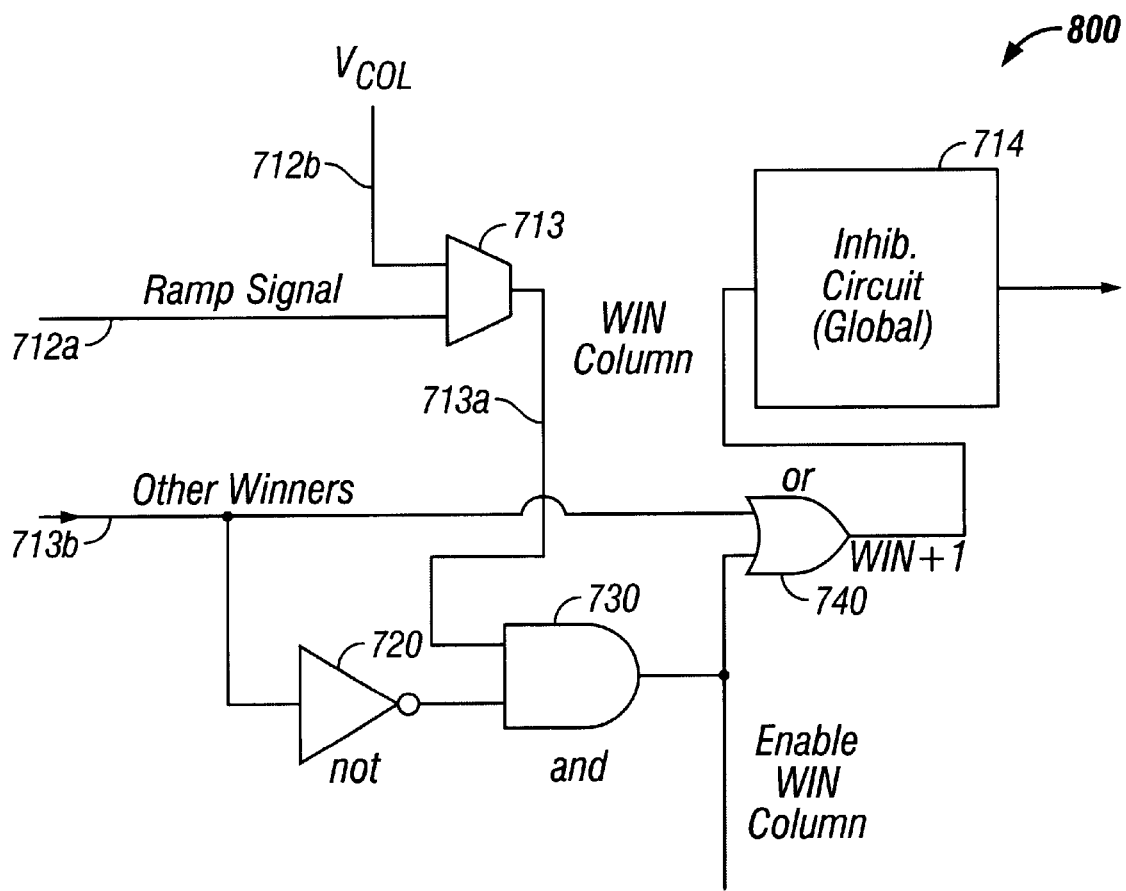
FIG. 8 is a diagram showing one embodiment of the comparator used in the device shown in FIG. 7.

The row winner-take-all circuit 700, however, may cause an error if two or more pixels in a selected row have close to the same pixel value as both could latch simultaneously. This issue can be addressed by using logic circuit as shown in FIG. 8 to select only one of the pixels with the same signal, e.g., the pixel that is first detected by the row winner-take-all circuit. This can be achieved by using a comparator circuit 800 with a "Daisy chain" to function as the comparator 712 in FIG. 7. The comparator 713 produced a state change when the input valve 712b reaches the ramp level. The output 713a is ANDed by AND gate 730 with the inverted signal indicated other winners on line 713b. Only if the ramp signal is tripped, and there are no other winners, is that valve taken as the winner. To get a list of winners, a synchronizing clock may be needed.

The above winner-take-all operations need to find a winner pixel for each row. Such operation can cause some delay. The processing speed can be improved by comparing each column to a "column winner" for every new row that is selected for readout. The "column winner" value and the corresponding row address are saved as shown in register 636b. After all rows are read out, column winners are then compared by using the above winner-take-all circuits to select the winning column and the corresponding row once per frame.

The above technique may be used to add additional circuitry to select the second winner and others as desired in a similar way for output.

Another alternative uses the circuit in FIGS. 6–8 to obtain row values in descending order of intensity. Each winner inhibits itself as described above by resetting its voltage using inhibitive circuit 714. Then, the next winner can be found using the same circuitry with the first winner inhibited. The new winner can inhibit itself for finding the next one and so forth.

Although the present invention has been described in detail with reference to the preferred embodiments, various modifications and enhancements may be made. For example, the sensor array may be formed in various configurations other than the exemplary CMOS photogate APS, including, CMOS photodiode APS, a pinned photodiode CMOS APS, a passive pixel photodiode sensor, a charge modulation device active pixel sensor, bipolar transistor-based pixels and other CMOS sensors. Instead of selecting the brightest pixel, the darkest pixel can also be selected with a reversed logic using essentially the same circuitry. These and other variations and modifications are intended to be encompassed by the appended claims.

What is claimed is:

1. A CMOS radiation-sensing device, comprising:
   a substrate formed of a semiconductor material;
   a detector array formed in said substrate and configured to have CMOS detector pixels to detect radiation by producing electrical signals indicating said radiation;
   a readout circuit having a plurality of storage cells formed in said substrate displaced from said detector array and connected to respectively receive said electrical signals from a group of pixels in said detector array in parallel to produce an output indicative of said radiation; and
   a pixel-selecting circuit formed in said substrate and configured to select a special pixel from said detector array which has a maximum pixel signal amplitude in a frame captured by said detector array,
   wherein said pixel-selecting circuit comprises an array of signal-processing circuits respectively connected to receive said electrical signals from said readout circuit in parallel, a ramp generator to produce a global ramp signal to said array of signal-processing circuits, an inhibitor circuit to permit a signal-processing circuit with a largest signal to output said largest signal and to inhibits other signal-processing circuits, a memory unit storing said largest signal value and an address of a corresponding pixel which produces said largest signal, and a comparator circuit to compare an existing signal in said memory unit with largest signals selected from other groups of pixels in said detector array to select said special pixel.

2. The device as in claim 1, wherein said inhibitor circuit includes an OR logic gate.

3. The device as in claim 1, wherein said signal-processing circuit includes a daisy chain circuit to select one of at least two pixels in a selected group that have substantially the same signal amplitudes.

4. The device as in claim 3, wherein each CMOS detector pixel is an active pixel sensor.

5. The device as in claim 4, wherein each CMOS detector pixel includes a photogate.

6. The device as in claim 4, wherein each CMOS detector pixel includes a photodiode.

7. The device as in claim 4, wherein each CMOS detector pixel includes a bipolar transistor.

8. A CMOS radiation-sensing device, comprising:
   a substrate formed of a semiconductor material;
   a detector array formed of active sensing pixels in rows and columns on said substrate;
   a readout circuit having a plurality of storage cells formed in said substrate displaced from said detector array and connected to receive pixel signals from columns of active sensing pixels in said detector array in parallel;

an array of signal-processing circuits respectively connected to said storage cells of said readout circuit in parallel to receive said pixel signals from said readout circuit;

a ramp generator on said substrate to produce a global ramp signal to said array of signal-processing circuits;

an inhibitor circuit coupled to said signal-processing circuits to permit a signal-processing circuit with a largest signal in a row of pixels to output said largest signal and to inhibits other signal-processing circuits in said row; and a comparator circuit to compare largest signals of different rows to select a pixel with a largest pixel signal in a frame captured by said detector array.

9. A method, comprising:

selecting a row of pixels from a sensor array of pixels in rows and columns on a substrate;

outputting pixel signals from the selected row of pixels to a bank of storage calls in parallel, respectively;

comparing the pixel signals in the storage cells from the selected row in response to a ramp signal common to all pixels in the selected row;

selecting a pixel in the selected row with a largest pixel signal to output while prohibiting other pixels in the selected row from being output; and comparing largest signals of different rows in a frame captured by the sensor array to determine a pixel with a largest pixel signal in the frame.

* * * * *